July 1, 1969 K. B. SWANSON 3,453,029
PRESSURE SENSITIVE METERING VALVE
Filed Aug. 31, 1967
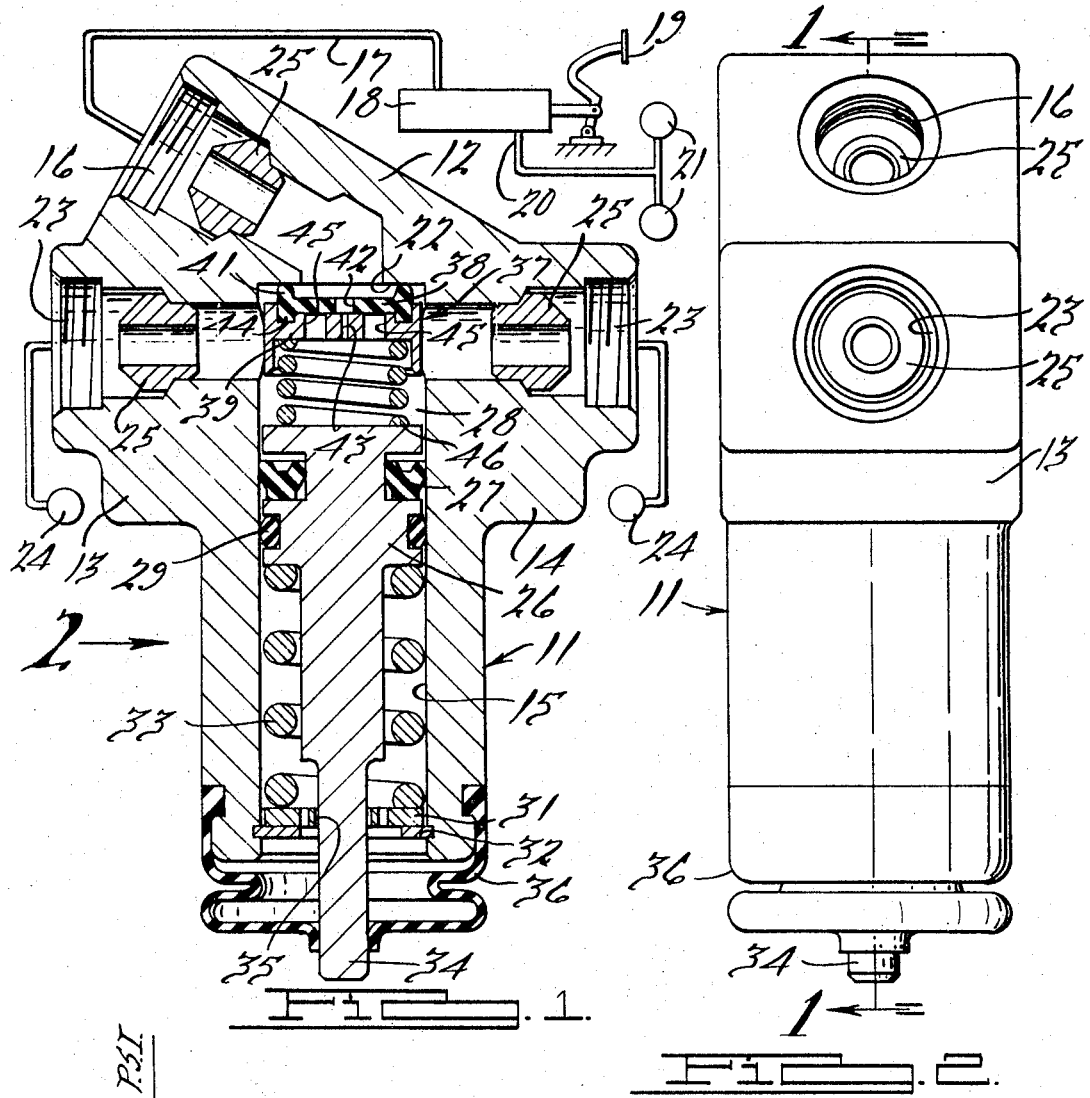
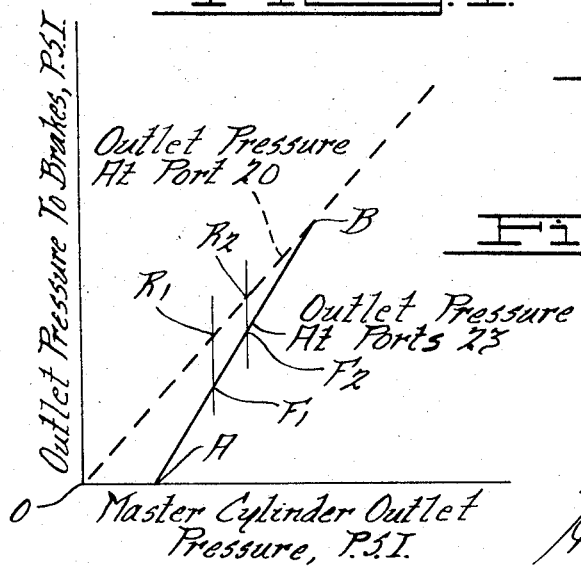
INVENTOR.
Kenneth B. Swanson
BY
Harness, Dickey & Pierce
ATTORNEYS.

United States Patent Office 3,453,029
Patented July 1, 1969

3,453,029
PRESSURE SENSITIVE METERING VALVE
Kenneth B. Swanson, Henderson, Mich., assignor to Midland-Ross Corporation, Owosso, Mich., a corporation of Ohio
Filed Aug. 31, 1967, Ser. No. 664,757
Int. Cl. B60t 13/00, 11/10; F16k 17/26
U.S. Cl. 303—6                                3 Claims

ABSTRACT OF THE DISCLOSURE

An automotive braking system having a pressure sensitive metering valve interposed between the master cylinder and two of the wheel brakes, the valve assembly having a combined poppet and check valve urged closed by a first spring, this spring being backed up by a piston urged toward it by a second spring, the piston being retractable in proportion to fluid pressure forced past said valve toward the outlets of the valve assembly.

BACKGROUND OF THE INVENTION

Field of the invention

The invention relates to automotive vehicle hydraulic braking systems, and particularly those in which it is desirable to withhold hydraulic pressure at the front wheels equipped with disc brakes while the pressure from the master cylinder is initially applied at the rear wheels.

State of the prior art

Various devices are known for retarding the application of pressure to one set of wheels, as for example the front wheels, of an automotive vehicle while applying full pressure from the master cylinder to the other set of wheels. Many of these devices depend on the presence of restrictive orifices interposed in the fluid line to obtain a pressure differential. Such devices are relatively difficult to control over broad performance ranges. Other devices employ pistons of different diameters with lost motion connections between them, or spring-backed pistons to resist pressure flowing toward one set of brakes. A disadvantage of such devices, as well as others known in the prior art, is that in gradually equalizing the pressure supplied to the front and rear brakes, the pressure equalizes as a function of an arc or curve. This is not in accordance with the most desirable form of operation, which is to have a gradual linear reduction in the pressure differential between the two sets of brakes as brake pedal pressure is increased, until at some point of relatively high pedal pressure, the hydraulic pressure is equalized at both front and rear sets of wheels. Moreover, prior art devices are not readily adaptable to vary the rate of reduction of the pressure differential since the prior art devices sense displaced, rather than pressure only, with the result that prior art devices tend to change the rate of reduction when the displacement varies.

SUMMARY OF THE INVENTION

The illustrated embodiment of the invention opeartes to effect an initial pressure differential and gradually reduce the pressure differential as a linear function as distinguished from a curved or arc function and is readily adapted to varying rates simply by changing springs. The present invention senses only pressure and does not sense displacement with the result that the rate of change does not vary even though the amount of fluid moving through the system may vary. The illustrated embodiment of the invention comprises a body having an inlet port at one end connected to the outlet of a master brake cylinder, and a pair of outlet ports leading from a central bore to the vehicle front brakes. A poppet valve disposed in this bore is urged against a valve seat surrounding the inlet port by a first helical coil compression spring. The valve has a flexible disc element and a support element which together form a check valve permitting fluid to flow back from the outlet ports toward the inlet port when the brake pedal is released.

A piston slidably mounted in the bore supports the first spring and has a second spring urging it toward the valve. In operation, the springs hold the valve closed (so that pressure is only applied to the rear brakes from the master cylinder) until a predetermined valve opening pressure is attained at which time a metered amount of fluid flows to the outlet ports to initially apply the front wheel brakes at relatively low pressure. The fluid also flows into the chamber bounded by the piston, counteracting the force of the second spring so as to reduce the closing force on the valve. Increased inlet pressure thus results in increased outlet pressure at a linear rate of increase such that, when the closing force of the piston spring is fully counteracted, the pressure at the outlet ports will become the pressure at the inlet port (which is the master cylinder and rear brake pressure). In other words, the pressure differential between the front and rear brakes will steadily decrease at a linear rate as brake pedal pressure is increased, until the pressure blend into one value.

Aside from achieving a blending of the pressure curves for the front and rear wheel brakes at a chosen brake pedal pressure, the device is easier to control within a given performance range because of the fact that the operation depends only upon the pressure applied, wthout the need for an orifice in obtaining the pressure differential.

BRIEF DESCRIPTION OF THE DRAWINGS

FIGURE 1 is a cross-sectional view taken along the line 1—1 of FIGURE 2 and showing the valve construction, along with a schematic showing of the master cylinder, brake pedal, and connections to the brakes;

FIGURE 2 is an end elevational view of the device taken in the direction of the arrow 2 of FIGURE 1, and FIGURE 3 is a chart showing the manner in which the pressure curves at the front and rear brakes will be blended into a single curve by means of the invention.

DESCRIPTION OF THE PREFERRED EMBODIMENT

The valve assembly comprises a body generally indicated at 11 having a somewhat elongated shape, with an inclined upper extension 12, a pair of oppositely disposed side extensions 13 and 14, and bore 15 extending upwardly from the bottom of the body to extension 12. An inlet 16 is formed in upper extension 12, this inlet port being connectible by piping indicated schematically at 17 to a master brake cylinder shown diagrammatically at 18. The master cylinder is pressurizable by a conventional brake pedal 19 of an automotive vehicle. Master cylinder 18 also has an outlet connection indicated schematically at 20 which leads to one pair of brakes on an automotive vehicle, for example, the rear brakes, indicated at 21. It may be mentioned at this point that the invention is especially useful in vehicles where the front wheels are equipped with disc brakes and it is just desired to apply braking forces initially at the rear wheels, the forces at the front and rear wheels being equalized when a higher pressure is attained.

Inlet port 16 leads to a valve seat 22 at the upper end of bore 15. A pair of outlet ports 23 are formed in extensions 13 and 14, respectively, these outlet ports being connected to the front wheel brakes 24. The outlet ports lead outwardly from the upper end of bore 15 immediately below valve seat 22. Flare fittings 25 are provided in ports 16 and 23 to facilitate connection to tubing.

A piston 26 is slidably mounted in bore 15, this piston having a seal 27 at its upper end of the type which will increase its sealing action when pressure is exerted on it from chamber 28 at the upper end of bore 15 and to which ports 16 and 23 are connected. A lower seal 29 is also provided on the piston to minimize leakage.

The lower end of bore 15 carries a retaining member 31 held in place by a snap ring 32. A relatively heavy helical coil compression spring 33 is disposed in bore 15, the lower end of this spring engaging member 31 and the upper end engaging the underside of piston 26. The piston has an extension 34 which passes through a guide aperture 35 in member 31, and boot 36 is mounted on the lower end of body 11 and surrounds extension 34 to prevent dirt from entering bore 15.

A valve generally indicated at 37 is disposed in bore 15 above piston 26. This valve comprises a disk 38 of material such as rubber, and a support 39 for the disk. Disk 38 has a sealing ridge 41 around its periphery which is engageable with seat 22, and a central passage 42. The bottom of disk 38 is flat and it normally engages a flat surface on support 39 so that fluid may not flow from port 16 through passage 42, although a very narrow orifice 43 is provided in body 39 to prevent the buildup of vacuum in the system.

Body 39 has an annular groove which receives a complementary portion 44 on disk 38 to retain the disk in position. Body 42 is somewhat narrower than bore 15 so that when valve disk 38 is lifted from seat 22, fluid may flow from port 16 past valve 37 into chamber 28. A plurality of circumferentially spaced passages 45 are provided in support 39, these passages being offset from passage 42. When the pressure in chamber 28 is higher than port 16, for example, upon release of the brake pedal, this pressure will lift disk 38 from body 39 and fluid will flow through passages 45 and 42 into port 16.

A spring 46 is disposed between piston 26 and valve support 39. This spring is of the helical coil compression type and in the embodiment illustrated is somewhat weaker than spring 33. When no hydraulic forces are exerted on piston 26, the spring arrangement is such that valve 37 will be held against seat 22.

In operation, assuming an initial condition in which no brake pedal pressure is being applied, the ports will be in the position shown in FIGURE 1. The chart in FIGURE 3 is referred to as indicating the relationship between the pressure at the outlet of the master cylinder and the pressures at ports 20 and 23 which lead to the rear and front brakes 21 and 24, respectively. The origin or point O of the FIGURE 3 chart indicates the condition when no brake pedal pressure is applied.

Upon the application of brake pedal pressure, the master cylinder outlet pressure to ports 16 and 20 will follow the dashed line curve in FIGURE 3. That is, the outlet pressure to the rear brakes will always equal the master cylinder outlet pressure.

However, the outlet pressure at ports 23 which lead to front brakes 24 will stay at zero as long as valve 37 is closed. When the point A is reached in FIGURE 3, a further increase in master cylinder outlet pressure at port 16 will cause compression of spring 46, and valve 37 will be slightly lifted from seat 22. A metered amount of hydraulic fluid will flow into chamber 28, thus increasing the pressure at ports 23. However, this fluid flow into chamber 28 will counterbalance the pressure from port 16, so that the spring 46 will again cause valve 37 to close. The situation will then be as indicated, for example, points $F_1$ and $R_1$ in FIGURE 3. That is, there will be some pressure $F_1$ applied at the front brakes but it will be less than the pressure $R_1$ at the rear brakes.

Increased master cylinder output will again cause valve 37 to open, permitting additional fluid to flow from port 16 into chamber 28 and thus to ports 23. This will increase the pressure at the front brakes to perhaps the point $F_2$. Meanwhile, the pressure at the rear brakes will have reached $R_2$. It should be noted, however, that the difference between $F_2$ and $R_2$ is considerably less than the difference between $F_1$ and $R_1$. The difference lies in the fact that as the pressure in chamber 28 increases, it will exert a force counteracting that of spring 33 and therefore causing downward retraction of piston 27. This in turn will relax spring 46 so that the increase in force on valve 37 resisting opening when pressure is applied at port 16 will become less as the absolute pressure at port 16 increases.

In other words, because of the progressively increasing force on piston 26 as pressure at port 16 increases, the pressure differential between port 16 on the one hand and ports 23 on the other hand will decrease. Finally a point B will be reached at which valve 37 will remain open, so that the pressure at ports 23 will equal that at port 16 (and thus at port 20 leading to the rear brakes). The rate of decrease of the pressure differential will be linear with constant rate springs and the point B at which this differential disappears may be predetermined by choosing proper spring characteristics. By varying the relative rates of the springs 33 and 46, any desired opening point, slope of curve and blend point can be obtained.

Upon release of brake pedal pressure, the decrease in pressure at port 16 will permit fluid to flow back from ports 23 through passages 45 and 42 to port 16.

It should be observed that the variable pressure differential between the front and rear brakes does not necessitate the use of variable rate springs. This is because of the unique arrangement of the valve assembly elements in which springs 33 and 46 act in tandem on valve 37, with piston 26 interposed between the springs and reacting to increased pressure in chamber 28 to decrease the force opposing the opening of valve 37.

What is claimed is:

1. In a pressure sensitive metering valve for controlling the fluid pressure differential between the front and rear brakes of an automotive vehicle, the combination including a body defining a bore extending inwardly from one end of said body to form a chamber, said body defining an inlet port at the other end of said body connected to the inner end of said bore, said body defining an outlet port communicating with said bore adjacent the inner end thereof, a valve controlling the flow of fluid through said inlet port, a support for said valve, said support and said valve defining a passageway permitting flow of fluid from said chamber to said inlet port, a piston mounted in said bore in sealed slidable relation with the surface thereof and in spaced relation with said support, a first spring disposed in said bore between said support and said piston, a second spring having a different spring rate than that of said first spring disposed in said bore between said piston and said one end of said body, both said springs opposing opening movement of said valve with the opposing force of said springs being reduced sequentially in proportion to increased pressure in said chamber.

2. The combination as set forth in claim 1, said second spring being supported at one end by said body and urging said piston towards said first spring whereby the pressure differential between said inlet and outlet ports decreases as a linear function in proportion to the inlet pressure and is reduced to zero at a predetermined inlet pressure.

3. The combination as set forth in claim 1, said valve and said support having mutually engageable surfaces separable in response to a decrease in fluid pressure at said inlet port and offset openings in said valve and the support exposed by separation of the valve and the support whereby fluid may flow from said chamber to said inlet port when the pressure in said chamber is greater than the pressure at said inlet port.

References Cited

UNITED STATES PATENTS

| | | |
|---|---|---|
| 3,339,579 | 9/1967 | Lewis et al. |
| 1,707,273 | 4/1929 | McCune _____ 137—529 XR |
| 2,133,575 | 10/1938 | Rosenberg _____ 137—493.2 |
| 3,278,241 | 10/1966 | Stelzer _____ 303—6 |

FOREIGN PATENTS 1,057,409   5/1959   Germany.

FERGUS S. MIDDLETON, *Primary Examiner.*

JOHN J. McLAUGHLIN, Jr., *Assistant Examiner.*

U.S. Cl. X.R.

60—54.5; 137—493.1, 529; 188—152